# (12) United States Patent
Komiya

(10) Patent No.: US 9,085,329 B2
(45) Date of Patent: Jul. 21, 2015

(54) AUTOMOTIVE REAR VEHICLE BODY STRUCTURE

(71) Applicant: Mazda Motor Corporation, Hiroshima (JP)

(72) Inventor: Katsuyuki Komiya, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/346,945

(22) PCT Filed: Nov. 8, 2012

(86) PCT No.: PCT/JP2012/007188
§ 371 (c)(1),
(2) Date: Mar. 24, 2014

(87) PCT Pub. No.: WO2013/069294
PCT Pub. Date: May 16, 2013

(65) Prior Publication Data
US 2014/0300137 A1    Oct. 9, 2014

(30) Foreign Application Priority Data
Nov. 11, 2011   (JP) ................................. 2011-247000

(51) Int. Cl.
*B62D 21/15*   (2006.01)
*B62D 21/11*   (2006.01)
*B62D 25/08*   (2006.01)

(52) U.S. Cl.
CPC .............. *B62D 21/155* (2013.01); *B62D 21/11* (2013.01); *B62D 25/087* (2013.01); *B60G 2206/604* (2013.01)

(58) Field of Classification Search
CPC ....................................................... B62D 21/11
See application file for complete search history.

(56) References Cited

U.S. PATENT DOCUMENTS

| 5,562,308 | A | * | 10/1996 | Kamei et al. | ................... | 280/788 |
| 6,120,060 | A | * | 9/2000 | Kocer et al. | ................... | 280/788 |
| 6,511,096 | B1 | * | 1/2003 | Kunert et al. | ................... | 280/785 |
| 6,869,090 | B2 | * | 3/2005 | Tatsumi et al. | ........ | 280/124.109 |

(Continued)

FOREIGN PATENT DOCUMENTS

| DE | 102006058993 | * | 6/2008 | ............ | B62D 21/11 |
| JP | 01-171778 U | | 12/1989 | | |

(Continued)

OTHER PUBLICATIONS

International Search Report; PCT/JP2012/007188; Feb. 19, 2013.

*Primary Examiner* — Nicole Verley
(74) *Attorney, Agent, or Firm* — Studebaker & Brackett PC

(57) ABSTRACT

Disclosed is an automotive rear vehicle body structure comprising: a rear subframe (21) having right and left side member segments (22), and a cross member segment (23) coupling the side member segments (22) together; and a rear suspension supported by the rear subframe (21). The cross member portion (23) has right and left lateral portions (23S) each composed a pipe-like shaped member extending vehicle-widthwise inwardly and downwardly from each of the right and left side member segments (22), and a central portion (23C) composed of a pipe-like shaped member coupling the lateral portions (23S) together. The central portion (23C) is disposed at a height position below a vertically middle position between an upper-arm support section (28) and a lower-arm support section (29).

3 Claims, 15 Drawing Sheets

(56) References Cited

U.S. PATENT DOCUMENTS

| | | | |
|---|---|---|---|
| 7,097,185 B2 * | 8/2006 | Kato et al. | 280/124.109 |
| 8,025,313 B2 * | 9/2011 | Tanaka et al. | 280/781 |
| 8,511,696 B2 * | 8/2013 | Tanaka et al. | 280/124.109 |
| 8,616,567 B2 * | 12/2013 | Eguchi et al. | 280/124.107 |
| 8,641,066 B2 * | 2/2014 | Kudla et al. | 280/124.109 |
| 8,684,382 B2 * | 4/2014 | Buschjohann et al. | 280/124.109 |
| 8,857,836 B2 * | 10/2014 | Okuyama et al. | 280/124.109 |
| 8,915,326 B2 * | 12/2014 | Leibl | 180/299 |
| 2004/0080188 A1 * | 4/2004 | Igarashi et al. | 296/203.04 |
| 2009/0243272 A1 * | 10/2009 | Tanaka et al. | 280/794 |
| 2014/0117654 A1 * | 5/2014 | Buschjohann et al. | 280/795 |
| 2014/0319880 A1 * | 10/2014 | Shigihara | 296/193.09 |
| 2014/0368000 A1 * | 12/2014 | Komiya | 296/193.07 |

FOREIGN PATENT DOCUMENTS

| | | |
|---|---|---|
| JP | 07-315245 A | 12/1995 |
| JP | 2000-272314 A | 10/2000 |
| JP | 2004-330855 A | 11/2004 |
| JP | 2005-280668 A | 10/2005 |
| JP | 2009-255902 A | 11/2009 |
| JP | 2010-030532 A | 2/2010 |
| JP | 2010-247622 A | 11/2010 |
| WO | WO 2009015722 A2 * | 2/2009 |

* cited by examiner

PRIOR ART

PRIOR ART

AUTOMOTIVE REAR VEHICLE BODY STRUCTURE

TECHNICAL FIELD

The present invention relates to an automotive rear vehicle body structure comprising a rear subframe having right and left side member segments and a cross member segment coupling the side member segments together, and a rear suspension supported by the rear subframe.

BACKGROUND ART

Generally, a rear subframe (having the same meaning as "rear suspension cross member") for supporting a rear has comprises right and left side member segments and a cross member segment coupling the side member segments together. As an automotive rear vehicle body structure comprising such a rear subframe, there have been known various structures as illustrated in FIGS. 16 and 17.

A conventional structure (Patent Document 1) schematically illustrated in FIG. 16 in the form of a bottom view comprises a subframe 80 having right and left side member segments 81, 81 and front and rear cross member segments 82, 83, wherein front and rear fixing sections 81a, 81b provided in respective front and rear regions of each of the right and left side member segments 81, 81 are coupled to a respective one of right and left rear side frames 84, 84, and a front portion 81c of each of the right and left side member segments 81, 81 is coupled to a vehicle-body cross member 85 through a respective one of extension members 86, 86.

In FIG. 16, the side member segment 81 is curved inwardly in a vehicle width direction to have an approximately circular arc shape, in top plan view. This curved structure is intended to ensure an installation space for a suspension spring (coil spring) in order to support the suspension spring by a base of the rear side frame 84, and to increase an arm length (a length of an arm 88) to suppress a change in suspension geometry (change in toe angle, camber angle, etc.) due to an up-and-down movement of a rear wheel 87.

In FIG. 16, the reference code 88 indicates a front lower arm, and the reference code 89 indicates a rear lower arm. Further, in the figures, the arrowed line F indicates a vehicle forward direction, and the arrowed line R indicates a vehicle rearward direction.

The conventional structure illustrated in FIG. 16 has the following problems.

First, a distance between the front and rear fixing sections 81a, 81b of the side member segment 81 is relatively long and curved. Thus, in order to ensure rigidity against an input of lateral force, it is necessary to increase a plate thickness of the side member segment 81, resulting in an increase in weight.

Further, in the event of a rear collision, a rear impact load received by a rear region of the rear side frame 84 is concentrated on a front region of the rear side frame 84, as indicated by the arrowed line in FIG. 16. This causes a problem of an increase in amount of deformation in members around a side sill located forward of the rear side frame 84.

Besides, a distance between the front fixing section 81a and a support section 88a for the front lower arm 88 is relatively long, which is disadvantageous in terms of rigidity.

Moreover, the front portion 81c of the side member segment 81 is connected to the vehicle-body cross member 85 through the extension member 86, so that rigidity of the subframe 80 is enhanced somewhat, but, on the other hand, an increase in length of the extension member 86 gives rise to a problem of causing the extension member 86 to more easily undergo deformation, and of increases in required installation space and weight of the extension member 86.

A conventional structure (Patent Document 2) schematically illustrated in FIG. 17 in the form of a bottom view comprises a subframe 80A having right and left side member segments 81, 81 and front and rear cross member segments 82, 83, wherein front and rear fixing sections 81a, 81b provided in respective front and rear regions of each of the right and left side member segments 81, 81 are coupled to a respective one of right and left rear side frames 84, 84. Further, the side member segment 81 is formed to be curved inwardly in a vehicle width direction to have an approximately circular arc shape, in top plan view, for the same purpose as that of the conventional structure in FIG. 16.

In FIG. 17, each of the side member segments 81, 81 is formed to be curved inwardly in the vehicle width direction, and the front fixing section 81a is coupled to the rear side frame 84. Thus, a front region of the subframe 80A is strongly supported by the rear side frame 84 which is a vehicle-body strength member extending in a front-rear direction, and the side member segment 8 becomes more likely to undergo deformation. This has been considered to be desirable in terms of coupling strength between the subframe 80A and a vehicle body and further in terms of suppression of a forward displacement of the subframe 80A during a rear collision.

However, as with the conventional structure in FIG. 16, the conventional structure illustrated in FIG. 17 is incapable of shortening a distance between the front fixing section 81a and a support section 88a for a front lower arm 88, which is disadvantageous in terms of rigidity.

As above, except for the point about the extension member 86, the conventional structure illustrated in FIG. 17 has the same problems as those in the conventional structure in FIG. 16. In FIG. 17, the same element or component as that in FIG. 16 is assigned with the same reference numeral or code.

Additionally, the conventional structure illustrated in FIG. 17 is configured to arrange the support section 88a for the front lower arm 88 and a support section for a front upper arm (not illustrated) provided upward of the front lower arm 88, at the same position in the front-rear direction, to cancel out loads between the upper arm on an upper-right side and the lower arm on an lower-right side and between the upper arm on an upper-left side and the lower arm on a lower-right side, i.e., by means of a cross (X) arrangement in front view. In this way, same-phase lateral forces (lateral forces causing the right and left rear wheels 87 to tilt toward the same side) input during turning of an automotive vehicle or the like can be cancelled out.

Although the conventional structure illustrated in FIG. 17 can cancel out same-phase lateral forces, it has the following problem, with regard to different-phase lateral forces (lateral forces causing the right and left rear wheels 87, 87 to tilt toward respective different sides) to be input during traveling of the vehicle on bumpy road or the like. In the conventional structure illustrated in FIG. 17, the cross member segment 82 is made from a panel, and an amount of vertical offset between the support section 88a of the front lower arm 88 and a central portion of the cross member segment 82, so that there is a problem that it is unable to sufficiently ensure rigidity against different-phase lateral forces, and the cross member segment 82 made from a panel undergoes plane resonance at a frequency of about 300 Hz.

As above, the conventional automotive rear vehicle body structures fail to sufficiently satisfy both ensuring of rigidity against same-phase lateral forces and different-phase lateral forces, and suppression of plane resonance.

LIST OF PRIOR ART DOCUMENTS

Patent Documents

Patent Document 1: JP 2010-247622A
Patent Document 2: JP 2009-255902A

SUMMARY OF THE INVENTION

The present invention has been made in view of the above circumstances, and an object thereof is to provide an automotive rear vehicle body structure capable of ensuring not only rigidity against same-phase lateral forces causing right and left wheels to tilt toward the same side but also different-phase lateral forces causing the right and left wheels to tilt toward respective different sides, and also suppressing plane resonance at a frequency of about 300 Hz.

In order to achieve the above object, the present invention provides an automotive rear vehicle body structure which comprises: a rear subframe having right and left side member segments and a cross member segment coupling the side member segments together; and a rear suspension supported by the rear subframe. Each of the side member segments has a front region provided with a front fixing section attached to a vehicle-body component, and each of the side member segments is provided with, at respective positions rearward of the front fixing section and approximately identical to a position of each of right and left ends of the cross member segment in a front-rear direction, an upper-arm support bracket and a lower-arm support bracket located below the upper-arm support bracket. The upper-arm support bracket and the lower-arm support bracket are disposed such that a part of the respective brackets and the front fixing section of the side member segment are positionally coincident with each other in a vehicle width direction. The upper-arm support bracket has an upper-arm support section which is located at a position above the front fixing section of the side member segment and by which an upper arm of the rear suspension is pivotally supported, and the lower-arm support bracket has a lower-arm support section which is located at a position below the front fixing section of the side member segment and by which a lower arm of the rear suspension is pivotally supported. The cross member segment has: right and left lateral portions each composed of a pipe-like shaped member extending from each of the side member segments vehicle-widthwise inwardly and downwardly; and a central portion composed of a pipe-like shaped member coupling the lateral portions together, the central portion of the cross member segment being set at a height position above the lower-arm support section and below a vertically middle position between the upper-arm support section and the lower-arm support section. The lower-arm support bracket is coupled to the central portion of the cross member segment, or a vehicle-widthwise inner end of each of the lateral portions.

The present invention has an advantageous effect of being able to ensure not only rigidity against same-phase lateral forces causing right and left wheels to tilt toward the same side but also different-phase lateral forces causing the right and left wheels to tilt toward respective different sides, and also suppress plane resonance at a frequency of about 300 Hz.

DISCLOSURE OF THE INVENTION

Based on the drawings, one embodiment of the present invention will be described in detail.

Figure 1:
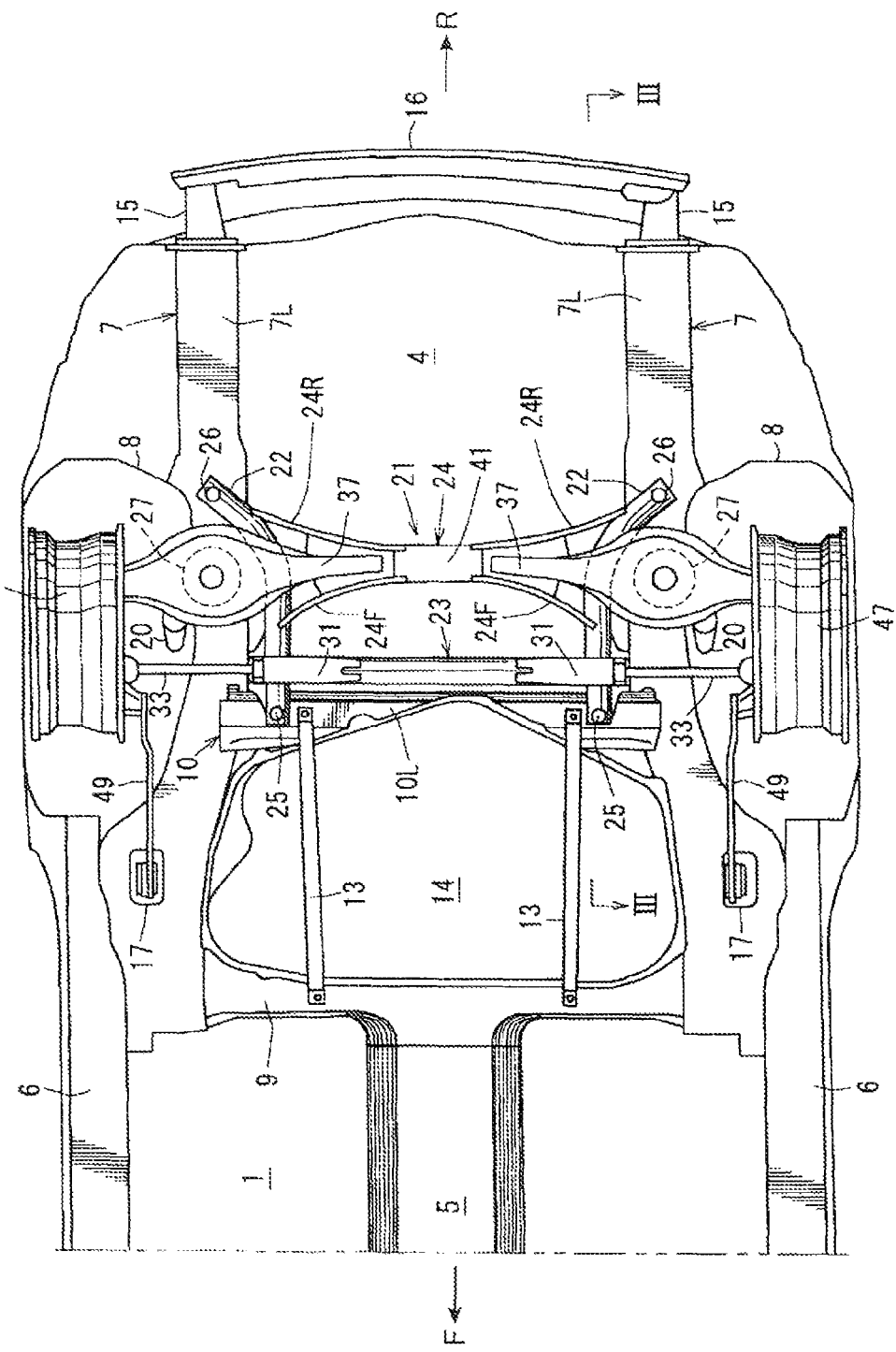
FIG. 1 is a bottom view illustrating an automotive rear vehicle body structure according to one embodiment of the present invention.
Figure 2:
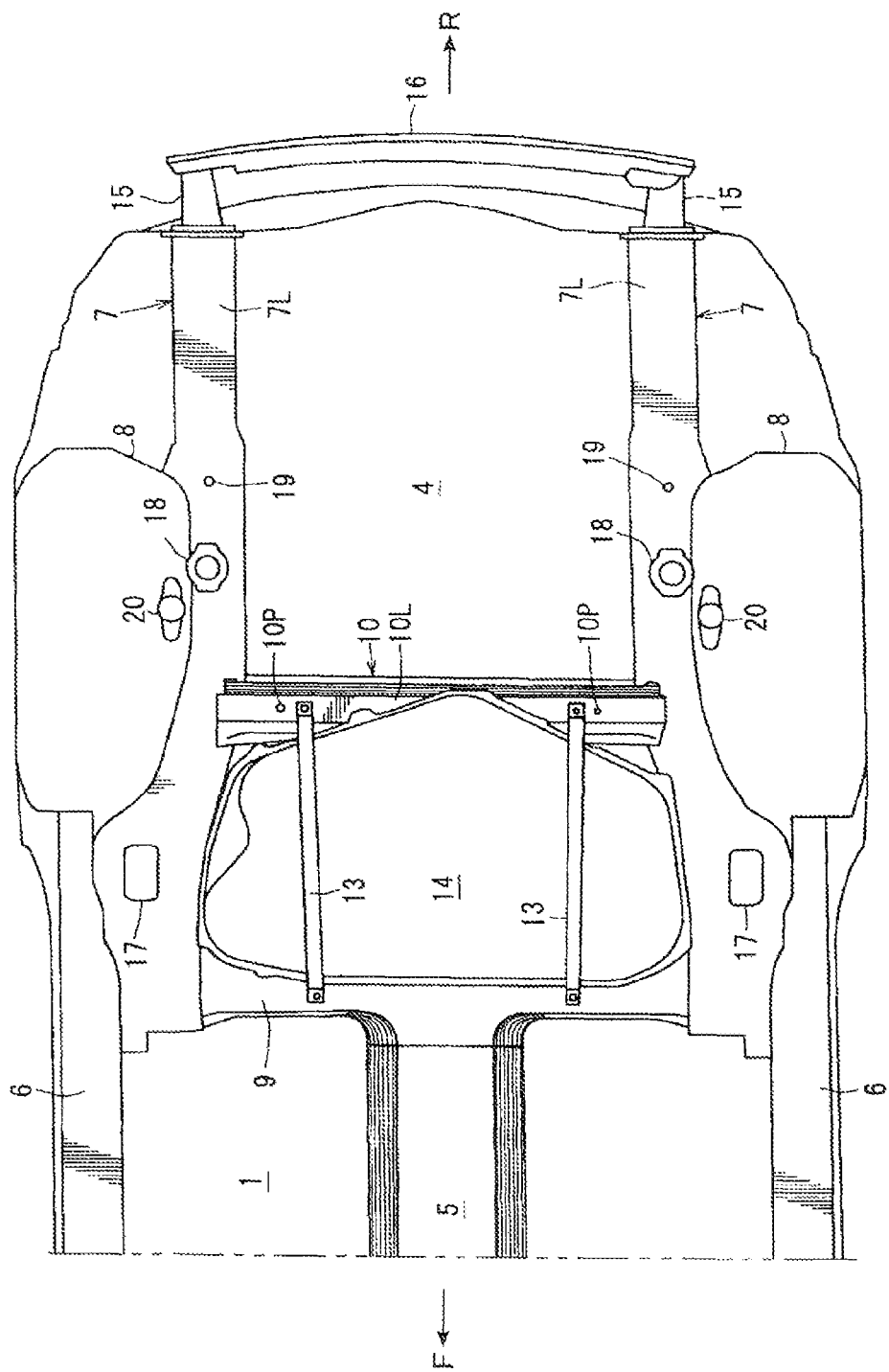
FIG. 2 is a bottom view of a state in which a rear subframe and a suspension arm are removed from the automotive rear vehicle body structure in FIG. 1.
Figure 3:
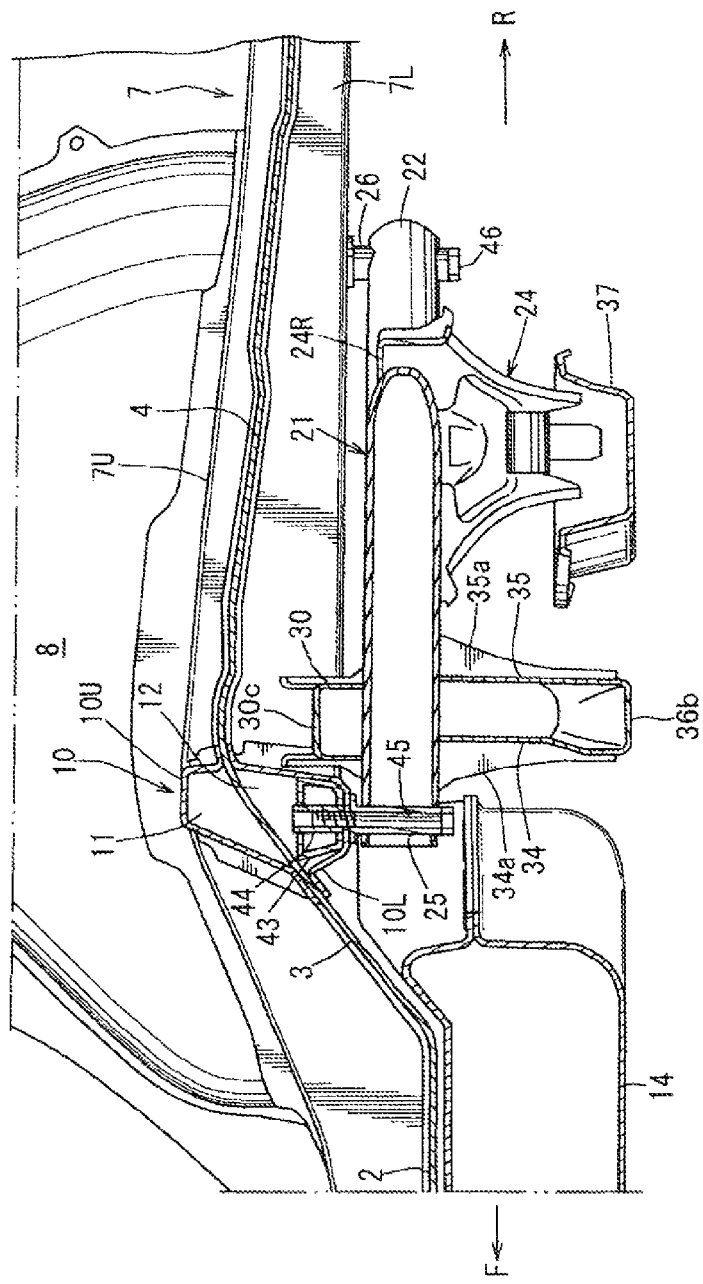
FIG. 3 is a sectional view taken along the arrowed line III-III in FIG. 1.

FIG. 1 is a bottom view illustrating an automotive rear vehicle body structure according to one embodiment of the present invention, and FIG. 2 is a bottom view of a state in which a rear subframe and a suspension arm are removed from the automotive rear vehicle body structure in FIG. 1, and FIG. 3 is a sectional view taken along the arrowed line III-III in FIG. 1, wherein the arrowed line F indicates a forward direction of the vehicle, and the arrowed line R indicates a rearward direction of the vehicle.

<Description of Vehicle Body Structure>

As illustrated primarily in FIGS. 2 and 3, a rear seat pan 2 and a slant section 3 extending obliquely upwardly and rearwardly from a rear edge of the rear seat pan 2 are provided rearward of a center floor panel 1, and further a rear floor 4 is provided rearward of the slant section 3.

A tunnel section 5 is integrally formed with a vehicle-widthwise central region of a set of the center floor panel 1 and a non-illustrated front floor panel to protrude toward an inside of a passenger compartment and extend in a vehicle front-rear direction, and two side sills 6 are joined, respectively, to vehicle-widthwise opposite edges of the set of the center floor panel 1 and the front floor panel.

A fuel tank 14 as a vehicle auxiliary component is mounted to a bottom (vehicle-exterior surfaces) of the rear seat pan 2 and the slant section 3, using a pair of tank bands 13.

Each of the side sills 6 is formed by joining a side sill inner panel and a side sill outer panel together. Each of the side sills 6 is a vehicle-body strength member having a side sill closed cross-section extending in the vehicle front-rear direction. According to need, a side sill reinforcement is provided within the side sill closed cross-section.

Each of a pair of right and left rear side frames 7 is provided to extend over a set of the rear seat pan 2, the slant section 3 and the rear floor 4, in the vehicle front-rear direction.

The rear side frames 7 are provided, respectively, on right and left sides of the vehicle, and located inward of a pair of right and left wheel houses 8 in a vehicle width direction. Each of the rear side frames 7 comprises a rear side frame upper panel 7U located on the side of an upper surface of the set of the rear seat pan 2, the slant section 3 and the rear floor 4, and a rear side frame lower panel 7L located on the side of a lower surface of the set of the rear seat pan 2, the slant section 3 and the rear floor 4. A rear side closed cross-section extending in the vehicle front-rear direction is defined between each of the rear side frame upper panel 7U and the rear side frame lower panel 7L, and the set of the components 2, 3, 4.

Each of the rear side frames 7 is a vehicle-body strength member, and a front end of each of the rear side frames 7 is coupled to a respective one of the side sills 6, at a position of a so-called "kick-up section" (a region where an aftermentioned No. 3 cross member 9 is disposed). A No. 3 cross member 9 is disposed to extend in the vehicle width direction between the front ends (coupling portions with the respective side sills 6) of the right and left rear side frames 7, 7. A closed cross-section extending in the vehicle width direction is defined between the cross member 9 and a vehicle-body floor panel (the rear seat pan 2).

Further, a No. 4 cross member 10 is disposed to extend in the vehicle width direction between the right and left rear side frames 7. More specifically, opposite right and left ends of the No. 4 cross member 10 are attached, respectively, to intermediate regions of the rear side frames 7 in the front-rear direction corresponding to a rear end of the slant section 3. In this embodiment, the No. 4 cross member 10 is equivalent to "vehicle-body component" set forth in the appended claims.

The No. 4 cross member 10 comprises: a cross member upper panel 10U located on the side of an upper surface of the slant section 3 to couple the right and left rear side frame upper panels 7U together in the vehicle width direction, and a cross member lower panel 10L located on the side of a lower surface of the slant section 3 to couple the right and left rear side frame lower panels 7L together in the vehicle width direction. A closed cross-section 11 extending in the vehicle width direction is defined between the cross member upper panel 10U and the slant section 3, and a closed cross-section 12 extending in the vehicle width direction is defined between the cross member lower panel 10L and the slant section 3. That is, the upper and lower closed cross-sections 11, 12 are formed in such a manner as to lie on top of each other, as illustrated in FIG. 3.

Further, the cross member lower panel 10L has two mounting points 10P each configured to allow an aftermentioned front fixing section 25 of each of side member segments 22 (see FIG. 1) to be mounted thereto at a position inward of a respective one of the rear side frames 7 in the vehicle width direction.

As illustrated in FIG. 2, right and left crush cans 15, 15 as an impact energy absorbing member are attached, respectively, to rear ends of the pair of right and left rear side frames 7, and a bumper reinforcement 16 extending in the vehicle width direction is disposed between the right and left crash cans 15.

Each of the rear side frame lower panels 7L has a front region provided with a trailing arm mounting portion 17 configured to allow an aftermentioned trailing arm 49 (FIG. 1) to be mounted thereto at a position between the front and rear cross members 9, 10, and an intermediate region in the front-rear direction provided with a spring seat 18 configured to allow an aftermentioned suspension spring 27 (FIG. 1) to be mounted thereto at a position rearward of the No. 4 cross member 10. Each of the rear side frame lower panels 7L further has a mounting point 19 configured to allow an aftermentioned rear fixing section 26 of each of side member segments 22 (see FIG. 1) to be mounted thereto at a position rearward of the spring seat 18. Further, a suspension damper mounting portion 20 is provided in each of the wheel houses 8.

<Description of Subframe>

As illustrated in FIG. 1 in the form of a bottom view, a rear subframe 21 is mounted to a vehicle body structure illustrated in FIGS. 2 and 3, to support a rear suspension.

Figure 4:
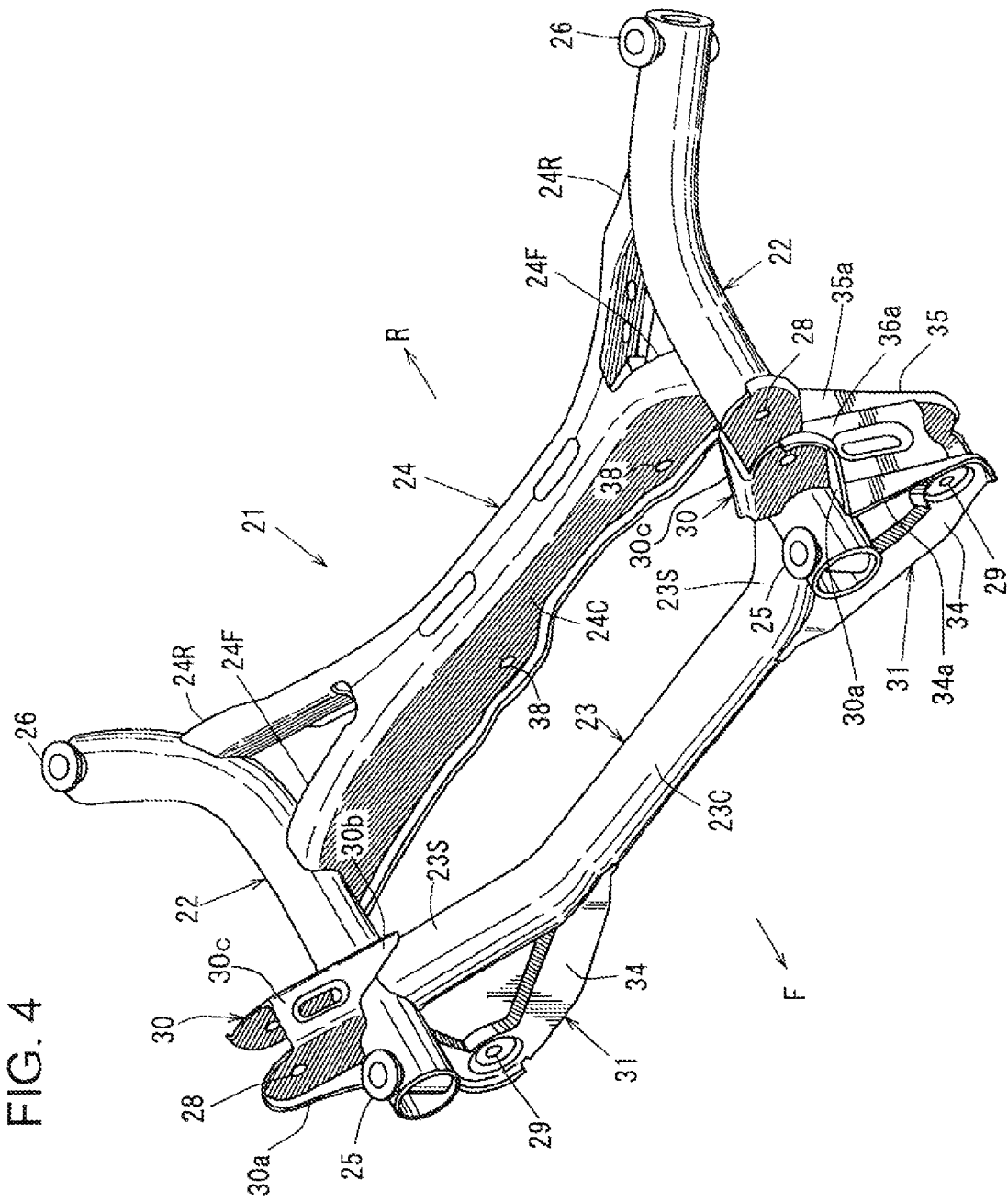
FIG. 4 is a perspective view of the rear subframe.
Figure 5:
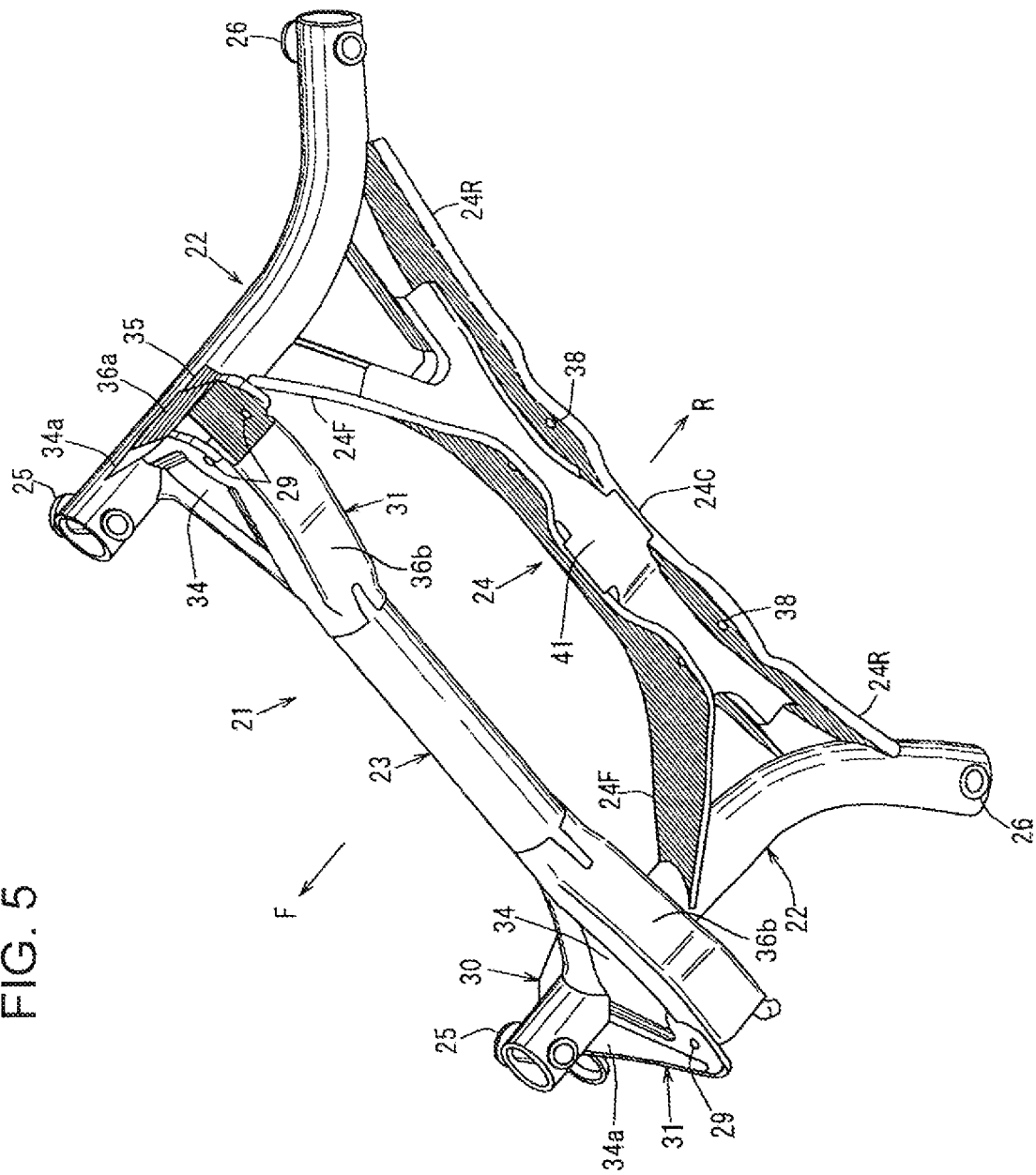
FIG. 5 is a perspective view of the rear subframe, when viewed obliquely upwardly from a lower side thereof.

FIG. 4 is a perspective view of the rear subframe 21, when viewed obliquely downwardly from an upper side thereof, and FIG. 5 is a perspective view of the rear subframe 21, when viewed obliquely upwardly from a lower side thereof. FIG. 6, FIG. 7, FIG. 8 and FIG. 9 are, respectively, a top plan view of the rear subframe 21, a front view of the rear subframe 21, a back view of the rear subframe 21, and a side view of the rear subframe 21.

Figure 6:
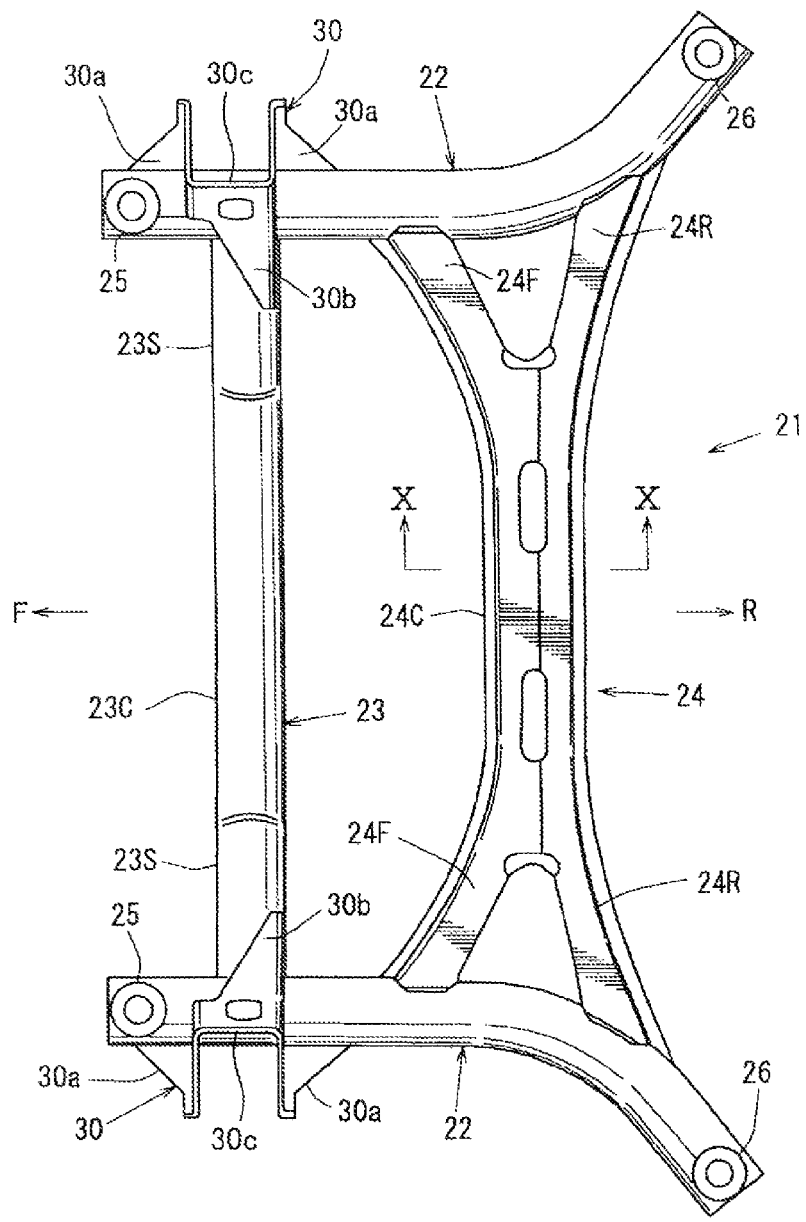
FIG. 6 is a top plan view of the rear subframe.

As illustrated in FIGS. 4 to 9, the rear subframe 21 comprises: right and left side member segments 22; and a front cross member segment 23 and a rear cross member segment 24 each mutually coupling the side member segments 22, and is formed in a bilaterally approximately symmetrical configuration in top plan view (see FIG. 6). In this embodiment, the front cross member segment 23 is equivalent to "cross member segment" set forth in the appended claims.

Each of the right and left side member segments 22 is composed of a pipe-like shaped member. Each of the side member segments 22 has front and rear end regions provided, respectively, with a front fixing section 25 (so-called "front mounting section") and a rear fixing section 26 (so-called "rear mounting section").

The front cross member segment 23 has right and left lateral portions 23S each extending vehicle-widthwise inwardly and downwardly from a front region (a linearly extending region) of a respective one of the right and left side member segments 22, and a horizontal central portion 23C coupling the right and left lateral portions 23S together in the vehicle width direction. The entire front cross member segment 23 having this structure is composed of a pipe-like shaped member.

As illustrated in FIG. 1, a rear region of each of the right and left side member segments 22 is attached to a respective one of the right and left rear side frames 7 through the rear fixing section 26, and a front region of each of the right and left side member segments 22 is attached, through the front fixing section 25, to a respective one of light and left lateral portions of the No. 4 cross member 10 located inward of the respective one of the right and left rear side frames 7 in the vehicle width direction. More specifically, the rear fixing section 26 is attached to the mounting point 19 of the rear side frame lower panel 7L (FIG. 2), and the front fixing section 25 is attached to the mounting point 10P of the cross member lower panel 10L (FIG. 2).

As illustrated in FIG. 1, in order to ensure a space for installing a suspension spring 27, each of the side member segments 22 is partially formed into a curved shape. That is, each of the side member segments 22 has a region extending from the rear fixing section 26 thereof obliquely inwardly in the vehicle width direction and forwardly, to allow the suspension spring 27 for the rear suspension to be installed forward of the oblique region. This achieves a balance between distribution of a rear impact load through the side member segment 22 and layout of the suspension spring 27.

Figure 11:
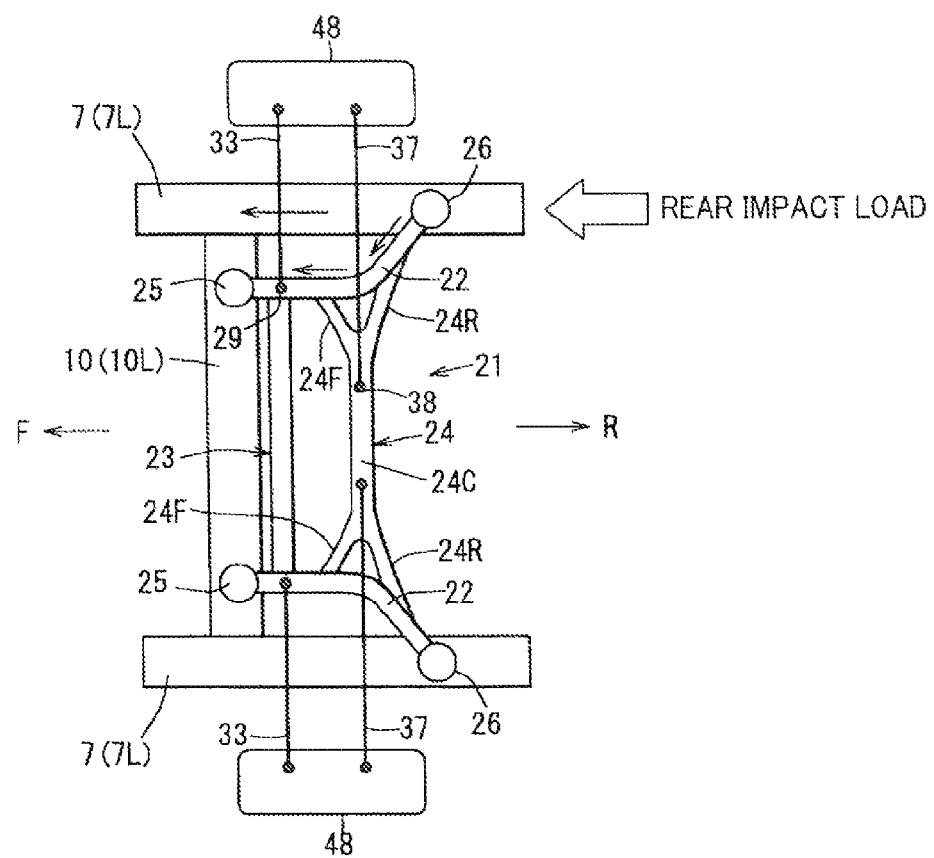
FIG. 11 is a bottom view schematically illustrating the automotive rear vehicle body structure.
Figure 12:
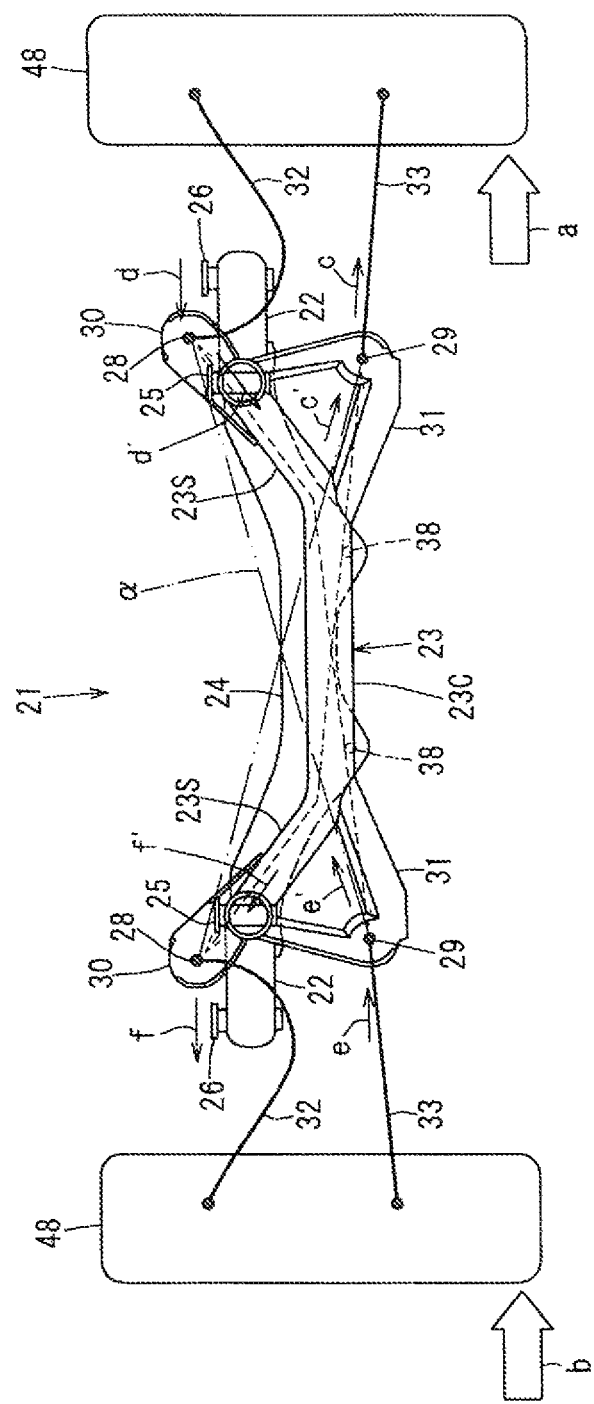
FIG. 12 is an explanatory diagram of an operation during input of same-phase lateral forces.
Figure 13:
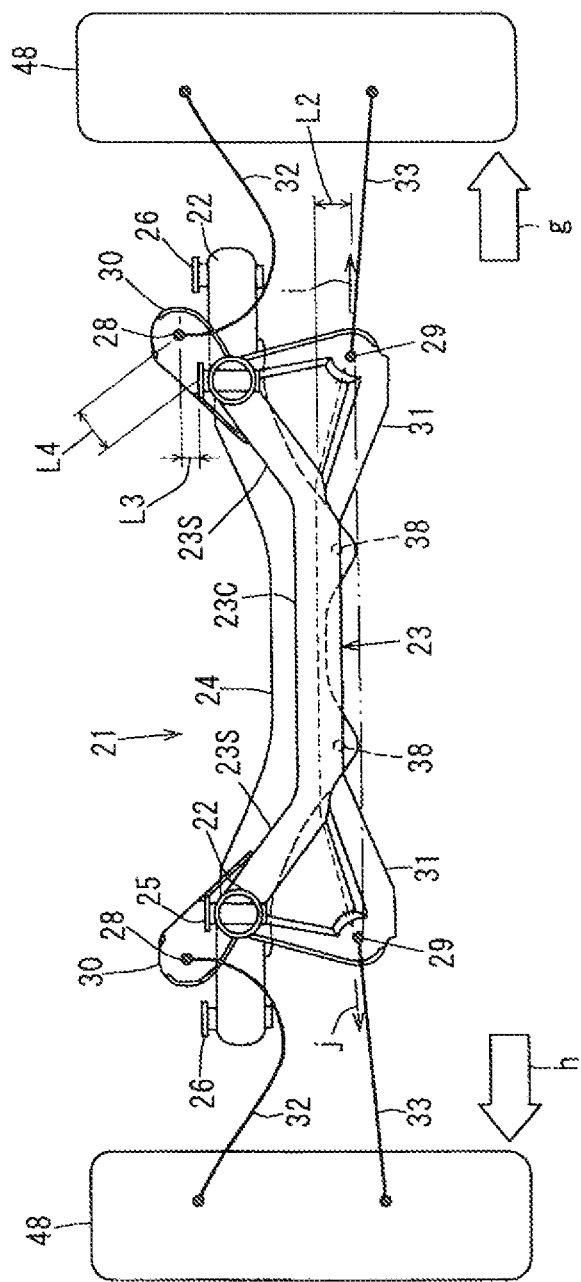
FIG. 13 is an explanatory diagram of an operation during input of different-phase lateral forces.

FIGS. 11 to 13 schematically illustrate the automotive rear vehicle body structure according to this embodiment. As illustrated in FIGS. 11 to 13 and FIG. 1, the rear suspension comprises: a front upper arm 32; a front lower arm 33 located below the front upper arm 32; a rear lower arm 37 located rearward of the front lower arm 33; a suspension spring 27 composed of a coil spring; and a trailing arm 49. In this embodiment, the front upper arm 32 is equivalent to "upper arm" set forth in the appended claims, and the front lower arm 33 is equivalent to "lower arm" set forth in the appended claims.

Each of the front upper arm 32, the front rear arm 33 and the rear lower arm 37 is provided to extend in the vehicle width direction to couple a rear wheel 48 (more specifically, a wheel support which is a mounting portion for a disc wheel 47 holding the rear wheel 48) and the rear subframe 21. The trailing arm 49 is provided to extend in the front-rear direction to couple the wheel support of the rear wheel 48 and the front region of the rear side frames 7. Based on functions of the arms 32, 33, 37, 49 and others, an up-and-down movement of the rear wheel 48 is controlled.

In this embodiment, as illustrated in the bottom view of FIG. 11 and the front views of FIGS. 12 and 13, the front upper arm 32 and the front lower arm 33 are provided to extend in the vehicle width direction in approximately parallel relation. The front upper arm 32 has a downwardly-concaved curved shape for avoiding interference with the rear side frame 7.

In this embodiment, as illustrated in FIG. 11 and FIG. 1, in order to ensure a toe-in (a toe angle in a state in which a front side of the rear wheel 48 is located inward in the vehicle width direction with respect to a rear side of the rear wheel 48), an arm length of the front arm (each of the front upper arm 32 and the front lower arm 33) is set to be less than an arm length of the rear lower arm 37. The term "arm length" here means a linear distance between vehicle-widthwise opposite ends of the arm (this also applies to the following description).

Further, in order to ensure a negative camber (a camber angle at which right and left rear wheels 48 are arranged to form a truncated chevron shape), an arm length of the front upper arm 32 is set to be less than an arm length of the front lower arm 33.

As illustrated in FIGS. 4 and 6, a front-arm support section 28 located above the front fixing section 25 and a rear-arm support section 29 located below the front fixing section 25 are provided on the front region of each of the right and left side member segments 22 at respective positions rearward of the front fixing section 25. Further, the front upper arm 32 is pivotally supported by the front-arm support section 28, and the front lower arm 33 is pivotally supported by the lower-arm support section 29.

In this embodiment, each of the upper-arm support section 28 and the lower-arm support sub-section 29 is formed by a part of a bracket (aftermentioned upper-arm support bracket 30 and lower-arm support bracket 31) attached to each of the side member segments 22.

Figure 7:
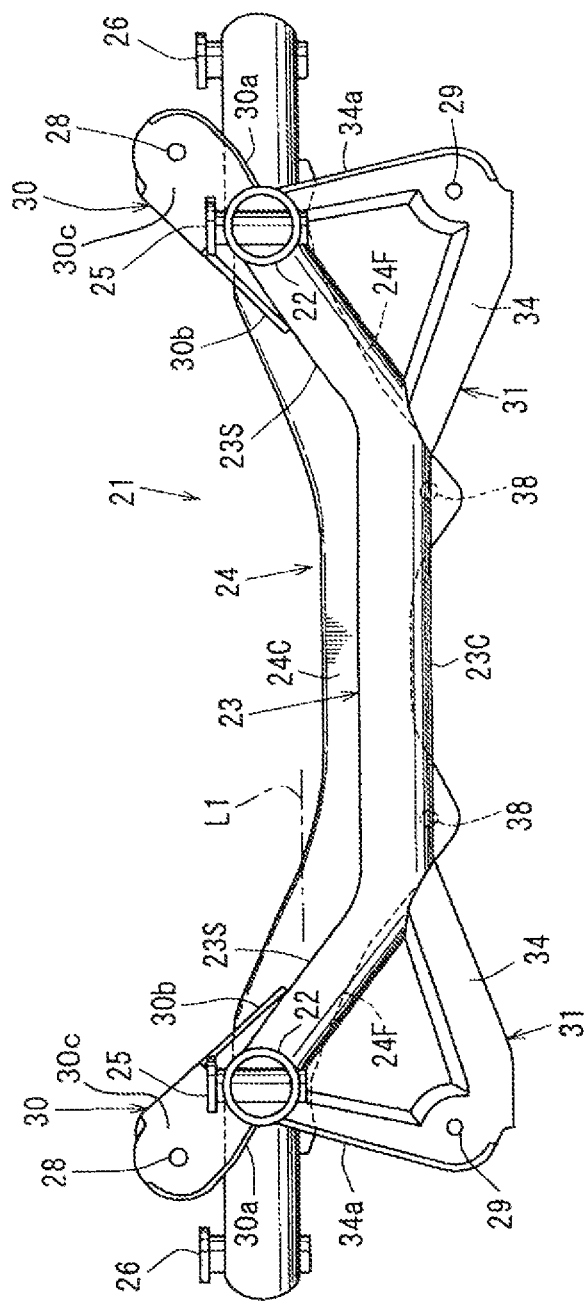
FIG. 7 is a front view of the rear subframe.
Figure 8:
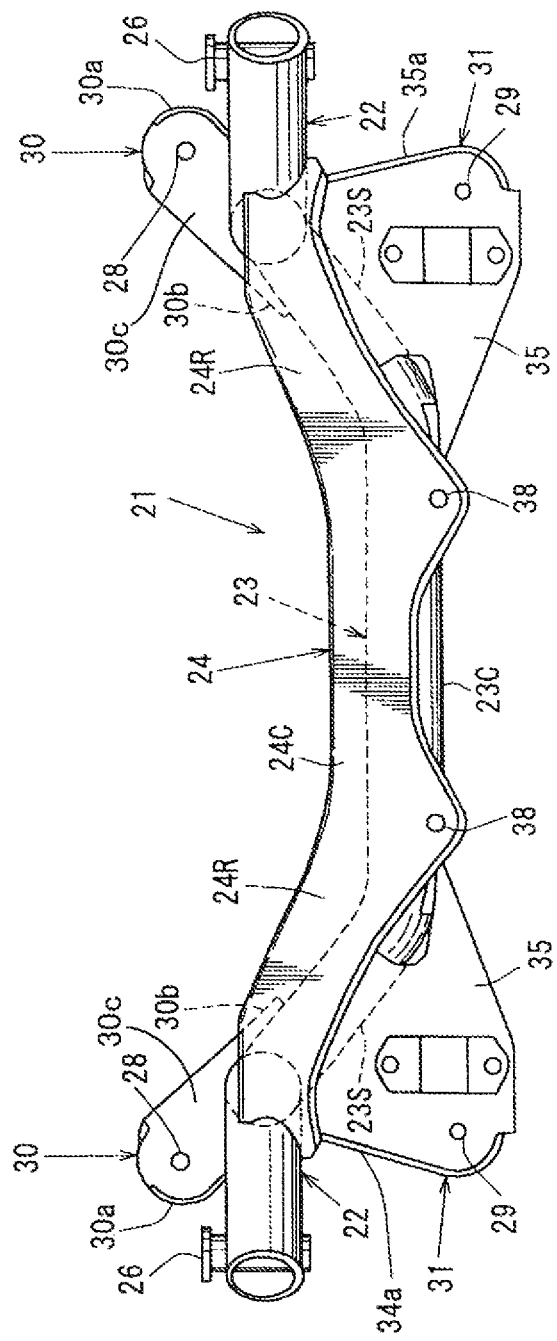
FIG. 8 is a back view of the rear subframe.

Specifically, as illustrated in FIGS. 4 and 7, an upper-arm support bracket 30 (hereinafter abbreviated and referred to simply and occasionally as "the bracket 30") is attached to the side member segment 22 at a position rearward of the front fixing section 25, and the upper-arm support section 28 is formed in the bracket 30. The bracket 30 is provided to extend along an extension line extending outwardly from each of the right and left lateral portions 23S of the front cross member segment 23, i.e., provided to protrude vehicle-widthwise outwardly and upwardly from the side member segment 22.

Further, a lower-arm support bracket 31 (hereinafter abbreviated and referred to simply and occasionally as "the bracket 31") extending vehicle-widthwise outwardly and downwardly from the side member segment 22 is attached to the side member segment 22 at a position rearward of the front fixing section 25 and approximately identical to a position of the bracket 30 in the front-rear direction, and the lower-arm support section 29 is formed in the bracket 31.

In FIG. 7, a vertically middle position between the upper-arm support section 28 and the lower-arm support section 29 is indicated by a virtual line L1. On the other hand, the central portion 23C of the front cross member segment 23 is set at a height position below the vertically middle position (virtual line L1) between the upper-arm and lower-arm support sections 28, 29.

As illustrated in FIGS. 6 to 9, the bracket 30 including the upper-arm support section 28 comprises a base portion 30c having an angular-C shaped cross-section, a pair of flange portions 30a protruding oppositely from the base portion 30c in the front-rear direction, and an extension portion 30b extending inwardly in the vehicle width direction from the base portion 30c. Each of the base portion 30c and the front and rear flange portions 30a of the bracket 30 is joined to the side member segment 22, and the extension portion 30b is joined to an upper region of an adjacent one of the lateral portions 23S of the front cross member segment 23.

The use of the bracket 30 configured as above makes it possible to prevent tilting of the bracket 30 in the front-rear direction, and ensure sufficient joint strength against a lateral force (lateral load).

As illustrated in FIGS. 4 to 9, the bracket 31 including the lower-arm support section 29 comprises: a front panel 34 and a rear panel 35 each formed in an approximately triangular shape in front view and disposed in spaced-apart relation in the front-rear direction; and a side panel 36a and a lower panel 36b each mutually connecting the front and rear panels 34, 35 in the front-rear direction. The side panel 36a is provided to close an opening facing outwardly in the vehicle width direction between the front and rear panels 34, 35, and the lower panel 36b is provided to close an opening facing downwardly between the front and rear panels 34, 35.

Each of the front and rear panels 34, 35 is joined to a lower surface of the side member segment 22, and a lower surface of the front cross member segment 23 (specifically, a region of the lower surface from each of opposite right and left ends of the central portion 23C to a vehicle-widthwise outer end of each of the lateral portions 23S. Further, the front panel 34 is integrally formed with a forwardly-protruding flange portion 34a, and the rear panel 35 is integrally formed with a rearwardly-protruding flange portion 35a. Each of the flange portions 34a, 35a is joined to the side member segment 22. A joint width of the bracket 31 in the front-rear direction with respect to the side member segment 22 is increased by a length equal to those of the flange portions 34a, 35a.

The use of the bracket 31 configured as above makes it possible to prevent tilting of the bracket 31 in the front-rear direction, and ensure sufficient joint strength against a lateral force (lateral load).

As above, in this embodiment, each of the side member segments 22 is provided with the brackets 30, 31 including the upper-arm support section 28 and the lower-arm support section 29, at a position rearward of the front fixing section 25, and the front arm (the front upper arm 32 and the front lower arm 33) of the rear suspension is pivotally supported by each of the arm support sections 28, 29. The bracket 30 including the upper-arm support section 28, the bracket 31 including the lower-arm support section 29, and each of the right and left ends of the front cross member segment 23 (vehicle-widthwise outer end of each of the lateral portions 23S), are attached to the side member segment 22 at approximately the same positions in the front-rear direction.

Figure 9:
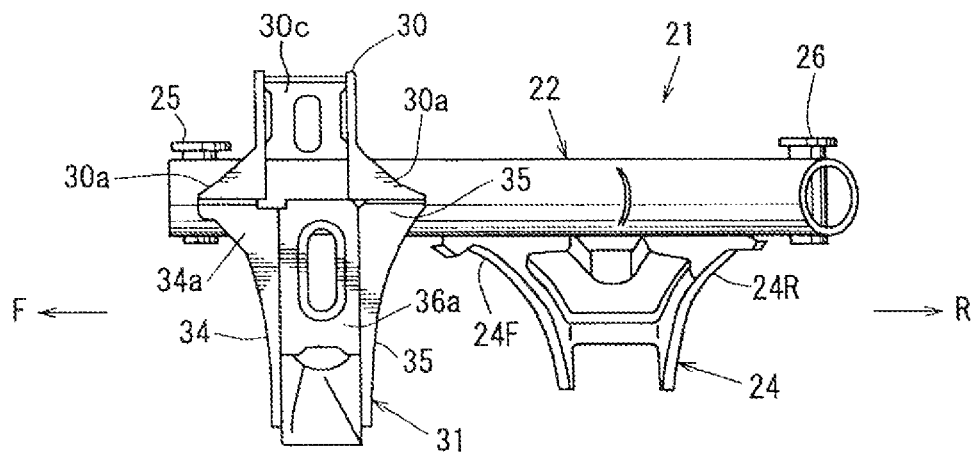
FIG. 9 is a side view of the rear subframe.

More specifically, attaching positions of the brackets 30, 31 on the side member segment 22 are set to be located rearward of and fairly close to the front fixing section 25 of the side member segment 22. Particularly, as illustrated in FIGS. 4 and 9, in this embodiment, the brackets 30, 31 are arranged in adjacent relation to the front fixing section 25 in such a manner that a part of the front flange portion 30a of the bracket 30, a part of the front flange portion 34a of the bracket 31, and the front fixing section 25 are positionally coincident with each other in the front-rear direction. In this way, a distance in the front-rear direction between a set of the brackets 30, 31 including the arm support sections 28, 29 and the front fixing section 25 of the side member segment 22 is shortened to thereby enhance torsional rigidity of the rear subframe 21.

Further, as illustrated in FIGS. 4 to 7, the brackets 30, 31 are arranged such that a part thereof is positionally coincident with the front fixing section 25 of the side member segment 22 in the vehicle width direction. That is, the brackets 30, 31 and the front fixing section 25 of the side member segment 22 are arranged side-by-side in the up-down (vertical) direction in front view (see FIG. 7) (in adjacent relation to each other in the vehicle width direction) in such a manner that the front fixing section 25 falls within both a vehicle-widthwise dimensional range of the upper bracket 30 and a vehicle-widthwise dimensional range of the lower bracket 31.

As illustrated in FIGS. 1, 3 and 11, the rear cross member segment 24 of the rear subframe 21 supports the rear lower arm 37, at a position spaced apart rearwardly from the bracket 31 (lower-arm support section 29) and the front cross member segment 23.

Specifically, as illustrated in FIGS. 4 to 9, the rear cross member segment 24 comprises: a central portion 24C located forward of each of the rear fixing sections 26 of the rear subframe 21; and a forwardly-inclined portion 24F and a rearwardly-inclined portion 24R each extending outwardly in the vehicle-width direction from each of opposite right and left ends of the central portion 24C. The central portion 24C is provided with two rear arm support sections 38 at respective right and left portions thereof. The rear lower arms 37 of the rear suspension illustrated in FIGS. 1 and 3 are pivotally supported, respectively, by the right and left rear arm support sections 38.

The rearwardly-inclined portion 24R and the forwardly-inclined portion 24F of the rear cross member segment 24 are provided to be branched from each of the right and left ends of the central portion 24C in a forked manner. More specifically, the rearwardly-inclined portion 24R extends obliquely (vehicle-widthwise outwardly and rearwardly) toward the rear fixing section 26 of each of the side member segments 22, and the forwardly-inclined portion 24F extends obliquely in a direction opposite to that of the rearwardly-inclined portion 24R (vehicle-widthwise outwardly and forwardly). Vehicle-widthwise outer ends of the branched inclined portions 24R, 24F are joined to the side member segment 22, so that a so-called truss structure is formed by these three components: the side member segment 22, the forwardly-inclined portion 24F and the rearwardly-inclined portion 24R.

Figure 10:
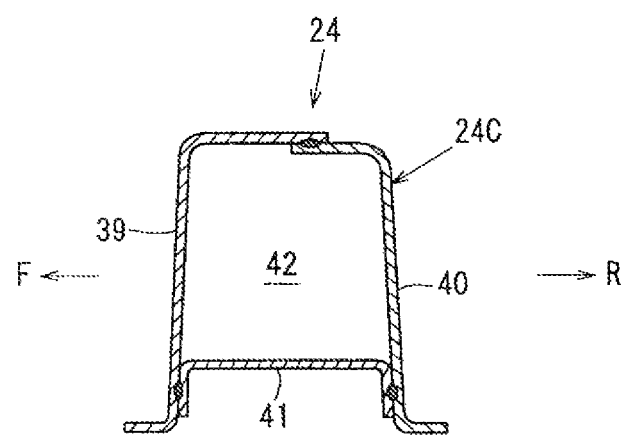
FIG. 10 is a sectional view taken along the arrowed line X-X in FIG. 6.

FIG. 10 is a sectional view taken along the arrowed line X-X in FIG. 6. As illustrated in FIG. 10, the rear cross member segment 24 is formed by joining a front member 39 composed of a plate bent into a reverse-L shape, and a rear member 40 composed of a plate bent into an L shape, together. Particularly, as represented by the cross-section in FIG. 10, the central portion 24C of the rear cross member segment 24 has a stiffner 41 joined to lower portions of the front and rear members 39, 40 to serve as a reinforcing member, so that a closed cross-section 42 extending in the vehicle width direction is defined by these three components (39, 40, 41). This closed cross-section structure makes it possible to enhance rigidity of the central portion 24C of the rear cross member segment 24, while suppressing an increase in weight.

Further, in this embodiment, as represented by the perspective view in FIG. 5, the stiffner 41 is provided not only in the central portion 24C but also a vehicle-widthwise midway position of the forwardly-inclined portion 24F and the rearwardly-inclined portion 24R of the rear cross member segment 24. This makes it possible to enhance rigidity of each of the inclined portions 24F, 24R, thereby effectively further reinforcing the rear cross member segment 24 without casing any increase in the number of components.

As illustrated in FIG. 3, the front fixing section 25 of each of the side member segments 22 is fastened and fixed to a nut 44 supported inside the closed cross-section 12 of the cross member lower panel 10L by a reinforcement 43, from below, using a bolt 45. In the same manner, the rear fixing section 26 of the side member segment 22 is fastened and fixed to each of the rear side frame lower panels 7L from below, using a bolt 46.

Further, as illustrated in FIGS. 1 and 3, in order to additionally serve as a spring seat for the suspension spring 27, the rear lower arm 37 has a portion being expanded in the front-rear direction at a position vertically opposed to the spring seat 18 (see FIG. 2) of the rear side frame lower panel 7L.

<Description of Operation>

Next, an operation of the automotive rear vehicle body structure illustrated in FIGS. 1 to 13 will be described. This vehicle body structure comprises: the rear subframe 21 having the right and left side member segments 22 and the front cross member segment 23 (cross member segment) coupling the side member segments 22 together; and the rear suspension supported by the rear subframe 21. Each of the side member segments 22 has the front region provided with the front fixing section 25 attached to the No. 4 cross member 10 (vehicle-body component), and each of the side member segments 22 is provided with, at respective positions rearward of the front fixing section 25 and approximately identical to a position of each of right and left ends of the front cross member segment 23 in the front-rear direction, the upper-arm support bracket 30 and the lower-arm support bracket 31 located below the upper-arm support bracket 30. The upper-arm support bracket 30 and the lower-arm support bracket 31 are disposed such that a part of the respective brackets 30, 31 and the front fixing section 25 of the side member segment 22 are positionally coincident with each other in a vehicle width direction. The upper-arm support bracket 30 has the upper-arm support section 28 which is located at a position above the front fixing section 25 of the side member segment 22 and by which the front upper arm 32 (upper arm) of the rear suspension is pivotally supported, and the lower-arm support bracket 31 has the lower-arm support section 29 which is located at a position below the front fixing section 25 of the side member segment 22 and by which the front lower arm 33 (lower arm) of the rear suspension is pivotally supported. The front cross member segment 23 has right and left lateral portions 23S each composed of a pipe-like shaped member extending from each of the side member segments 22 vehicle-widthwise inwardly and downwardly, and the central portion 23C composed of a pipe-like shaped member coupling the lateral portions 23S together, wherein the central portion 23C of the front cross member segment 23 is set at a height position above the lower-arm support section 29 and below the vertically middle position between the upper-arm support section 28 and the lower-arm support section 29 (virtual line L1 in FIG. 7). The lower-arm support bracket 31 is coupled to each of the lateral portions 23S and each of the right and left ends of the central portion 23C in the front cross member segment 23.

The features of the above vehicle body structure have the following advantageous effects.

Figure 16:
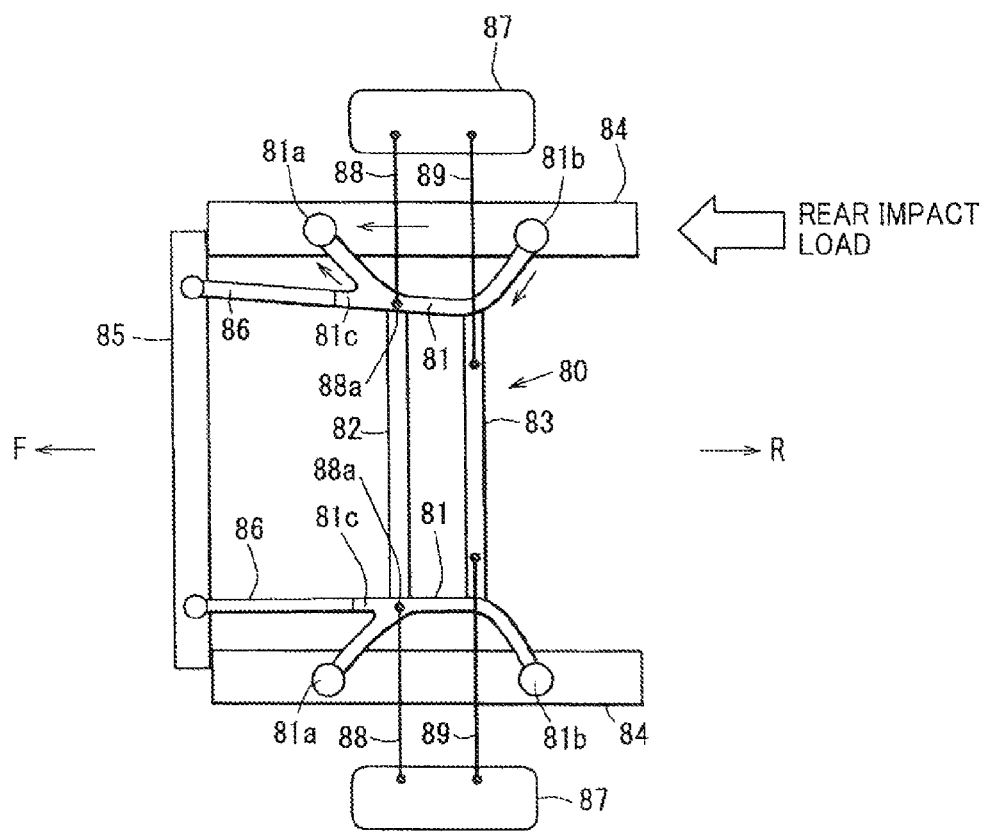
FIG. 16 is a bottom view schematically illustrating one example of a conventional automotive rear vehicle body structure.
Figure 17:
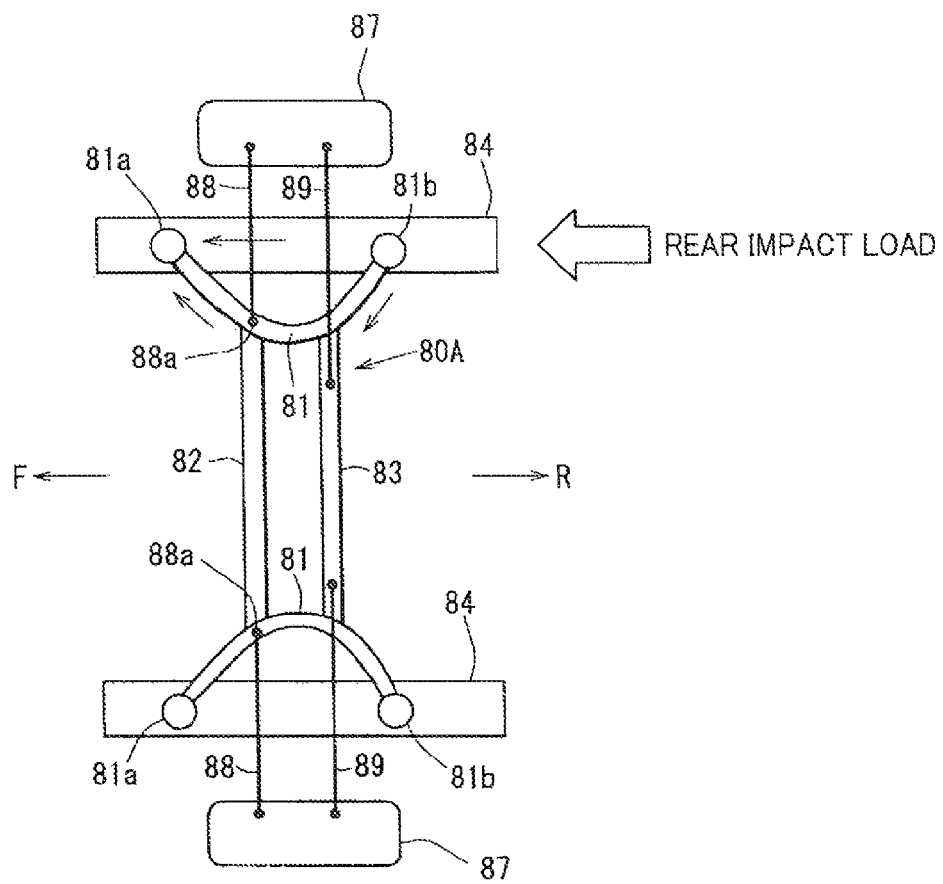
FIG. 17 is a bottom view schematically illustrating another example of the conventional automotive rear vehicle body structure.

That is, the upper-arm support section 28 and the lower-arm support section 29 are provided rearward of the front fixing section 25 of the side member segment 22 in such a manner that their positions are partly coincident with the front fixing section 25 in the vehicle width direction, so that it is able to achieve shortening of a distance in the vehicle width direction between each of the arm support sections 28, 29 and the front fixing section 25, as compared, for example, to the conventional structures described in FIGS. 16 and 17 in which the arm support section is provided at a position offset inwardly in the vehicle width direction with respect to the front fixing section. This makes it possible to allow the arm support sections 28, 29 to be strongly attached to the vehicle body, thereby satisfying both ensuring of supporting rigidity for rear suspension arms (supporting rigidity for the front upper arm 32 and the front lower arm 33), and lighter weight and higher rigidity in the rear subframe 21.

In the above vehicle body structure, the arm support sections 28, 29 and the front cross member segment 23 are arranged at approximately the same positions in the front-rear direction, so that it is able to suppress a vehicle-widthwise bending moment applied to the side member segment 22 due to a lateral force (lateral load), and prevent an undesirable change in suspension geometry, as compared to the case where the three components are different in terms of a front-rear position.

In the above vehicle body structure, the lower-arm support bracket 31 provided below the front fixing section 25 of the side member segment 22 is coupled to each of the lateral portions 23S and each of the right and left ends of the central portion 23C in the front cross member segment 23, so that it is able to linearly transmit a lateral force input from either one of the right and left lower arm support sections 29 to the other lower arm support section 29 through the central portion 23C, and thereby sufficiently ensure support rigidity for the front lower arm 33.

In the above vehicle body structure, the central portion 23C of the front cross member segment 23 is set at a position above the lower arm support section 29, and therefore cross (X)-shaped load transmission paths are formed between the upper arm support section 28 on an upper-right side and the lower arm support section 29 on a lower-left side and between the upper arm support section 28 on an upper-left side and the lower arm support section 29 on a lower-right side (see FIG. 12). In this way, same-phase lateral forces (lateral forces causing the right and left rear wheels 48 to tilt toward the same side) input during turning of an automotive vehicle or the like are cancelled out via the cross (X)-shaped load transmission paths, so that it is able to achieve enhanced rigidity of the rear subframe 21. In addition, the front cross member segment 23 is composed of a pipe member, so that it is able to effectively suppress plane resonance at a frequency of about 300 Hz.

In the above vehicle body structure, the central portion 23C of the front cross member segment 23 is set at a position below the vertically middle position (virtual line L1 in FIG. 7) between the upper-arm support section 28 and the lower-arm support section 29, so that it is able to shorten a vertical distance L2 between the central portion 23C of the front cross member segment 23 and the right and left lower arm support sections 29 to which a relatively large lateral force (lateral force greater than a lateral force against the upper arm support section 28) is to be applied (see FIG. 13). In this way, different-phase lateral forces (lateral forces causing the right and left rear wheels 48 to tilt toward respective different sides) input during traveling of the vehicle on bumpy road or the like can be cancelled out in a horizontal direction through the central portion 23C.

In short, the vehicle body structure according to the above embodiment can ensure not only rigidity against same-phase lateral forces but also rigidity against difference-phase lateral forces, and further suppress plane resonance at a frequency of about 300 Hz.

The aforementioned operations for same-phase lateral forces and difference-phase lateral forces will be described below in more detail.

Firstly, with reference to FIG. 12, an operation in a situation where same-phase lateral forces (lateral forces causing the right and left rear wheels 48 to tilt in the same side) are input during turning of an automotive vehicle or the like will be described. In FIG. 12, the vehicle is viewed rearwardly from a front side thereof. Thus, a right side of the drawing corresponds to a left side of the vehicle, and a left side of the drawing corresponds to a right side of the vehicle.

When the same-phase lateral forces b, a are input, respectively, into the right and left rear wheels 48, a pulling force c and a pushing force d are applied, respectively, to the left lower arm 33 and the left upper arm 32, and a pushing force e and a pulling force f are applied, respectively, to the right lower arm 33 and the right upper arm 32.

As is clear from FIG. 12, in the body structure according to the above embodiment, the upper-arm support bracket 30, the lateral portion 23S and the central portion 23C of the front cross member segment 23, and the lower-arm support bracket 31 connect generally along a straight line obliquely extending in a direction from a right upper region to a left lower region of the vehicle or from a left upper region to a right lower region of the vehicle. Thus, paths connecting between respective ones of the left arm support sections 28, 29 and the right arm support sections 28, 29 diagonally cross to form an X shape, so that oblique forces c', d', e', f' indicated by the arrowed lines in FIG. 12 are applied from the brackets 30, 31 to the front cross member segment 23. Therefore, the left pulling force c' and the right pulling force f' cancel each other out, and the right pushing force e' and the left pushing force d' cancel each other out, so that it becomes possible to cancel out the same-phase lateral forces. In FIG. 12, load transmission paths forming an ideal X shape are indicated by the virtual lines α.

Next, with reference to FIG. 13, an operation in a situation where different-phase lateral forces are input, respectively, into the right and left rear wheels 48, during traveling on tucks or bumpy road, will be described. In FIG. 13, the vehicle is viewed rearwardly from a front side thereof. Thus, a right side of the drawing corresponds to a left side of the vehicle, and a left side of the drawing corresponds to a right side of the vehicle.

When the different-phase lateral forces h, g are input, respectively, into the right and left rear wheels 48, a pulling force i and a pulling force j are applied, respectively, to the left lower arm 33 and the right lower arm 33.

As is clear from FIG. 13, in the body structure according to the above embodiment, an offset amount (distance L2) in the up-down direction between the central portion 23C of the front cross member segment 23 and the lower-arm support section 29 is set to a relatively small value. That is, the central portion 23C of the front cross member segment 23 is disposed between the upper-arm support section 28 and the lower-arm support section 29, at a position closer to the lower-arm support section 28. Further, each of an offset amount (distance L3) in the up-down direction between the front fixing section 25 and the upper-arm support section 28 of the side member segment 22 and a linear distance L4 therebetween is also set to a relatively small value. This makes it possible to enhance rigidity of the brackets 30, 31 and the front cross member segment 23, and allow the relatively large pulling forces j, i input into the right and left lower arms 33 (pulling forces greater than loads input, respectively, into the right and left upper arms 32) to cancel each other out via the central portion 23C of the front cross member segment 23, thereby cancelling out the different-phase lateral forces.

In the above embodiment, each of the side member segments 22 is formed from a pipe-like shaped member, and the lower-arm support bracket 31 is coupled to the side member segment 22.

According to this feature, the side member segment 22 is formed from a pipe-like shaped member resistant to torsion, and the lower-arm support bracket 31 including the lower-arm support section 29 is coupled to not only the front cross member segment 23 but also the side member segment 22, so that it is able to further promote a reduction in weight and an increase in rigidity against a lateral force, in the rear subframe 21.

In the above embodiment, the upper-arm support section 28 is provided in the upper-arm support bracket 30 at a position located on an extension line extending outwardly in the vehicle width direction from each of the right and left lateral portions 23S of the front cross member segment 23.

According to this feature, upon input of right and left same-phase lateral forces (see FIG. 12), it is able to more effectively cancel out the lateral forces between the upper-arm support section 29 on either one of right and left sides of the rear subframe 21 and the lower-arm support section 29 on the other side. It is also able to shorten a distance in the front-rear direction between each of the arm support sections 28, 29 and the front fixing section 25 of the side member segment 22 and thereby achieve lighter weight and higher rigidity in the rear subframe 21, as compared, for example, to a structure in which both of the arm support sections 28, 29 are provided below the side member segment 22 (for this purpose, the arm support sections 28, 29 are positionally offset in the front-rear direction).

In the above embodiment, the rear subframe 21 comprises, at a position spaced apart rearwardly from the front cross member segment 23, the rear cross member segment 24 supporting the rear lower arm 37 of the rear suspension. The rear cross member segment 24 comprises the central portion 24C having the rear-arm support section 38 which is provided at each of right and left portions thereof and by which the rear lower arm 37 is pivotally supported, and the forwardly-inclined portion 24F and the rearwardly-inclined portion 24R branched forwardly and rearwardly from each of the right and left ends of the central portion 24C and coupled to each of the side member segments 22.

According to this feature, each of right and left portions of the rear cross member segment 24 is coupled to each of the side member segments 22 while being branched into two in a forked manner, so that a truss structure is formed by the branched portions (the rearwardly-inclined portion 24R and the forwardly-inclined portion 24F) and the side member segment 22. The truss structure can efficiently reinforce the rear cross member segment 24 and thus the side member segment 22, so that it is able to enhance support rigidity for the rear lower arm 37 while suppressing an increase in weight. In addition, the rear cross member segment 24 configured as above and the front cross member segment 23 formed using a pipe member provide an advantage of being able to significantly enhance rigidity of the rear subframe 21 against input loads in the front-rear direction and vehicle width direction. Furthermore, it is able to enhance rigidity of the rear-arm support section against a load in the front-rear direction.

The rear vehicle body structure according to the above embodiment comprises: the right and left rear side frames 7, and the No. 4 cross member 10 mutually coupling the right and left rear side frames 7 and defining a closed cross-section in cooperation with the slant section 3 of the vehicle-body floor panel. Each of the right and left side member segments 22 has a rear region provided with the rear fixing section 26 attached to a respective one of the right and left rear side frames 7, and a front region provided with the front fixing section 25 attached to the No. 4 cross member 10. A position of the front fixing section 25 of each of the side member segments 22 is set to be located inward of the respective one of the rear side frames 7 in the vehicle width direction.

According to this feature, the front fixing section 25 of each of the right and left side member segments 25 is attached to the No. 4 cross member (i.e., a vehicle-body component located inward of a respective one of the right and left rear side frames 7 in the vehicle width direction) mutually coupling the right and left rear side frames 7. Thus, as compared to a structure in which the front fixing section is attached to the rear side frame 7, a distance in the vehicle width direction between the arm support section (the upper-arm support section 28 and the lower-arm support section 29) and the front fixing section 25 provided in each of the side member segments 22 becomes shorter, and a rear suspension arm length (arm lengths of the front upper arm 32 and the front lower arm 33) becomes longer. This makes it possible to enhance rigidity of the rear subframe 21 without providing an additional member such as a reinforcing member, thereby achieving lighter weight and higher rigidity in the rear subframe 21.

In the event of a vehicle rear collision, as indicated by the arrowed lines in FIG. 11, a rear impact load received by a rear region of the rear side frame 7 is transmitted to the No. 4 cross member 10 via the side member segment 22, and then distributed from the No. 4 cross member 10 to a member other than the rear side frame 7, such as a vehicle-body floor panel. In this way, the distribution of a rear impact load can be promoted, so that it becomes possible to suppress forward displacement of the rear subframe 21 and deformation of a vehicle-body member located forward of the rear subframe 21, due to the rear impact load, and further enhance rear impact safety.

Figure 14:
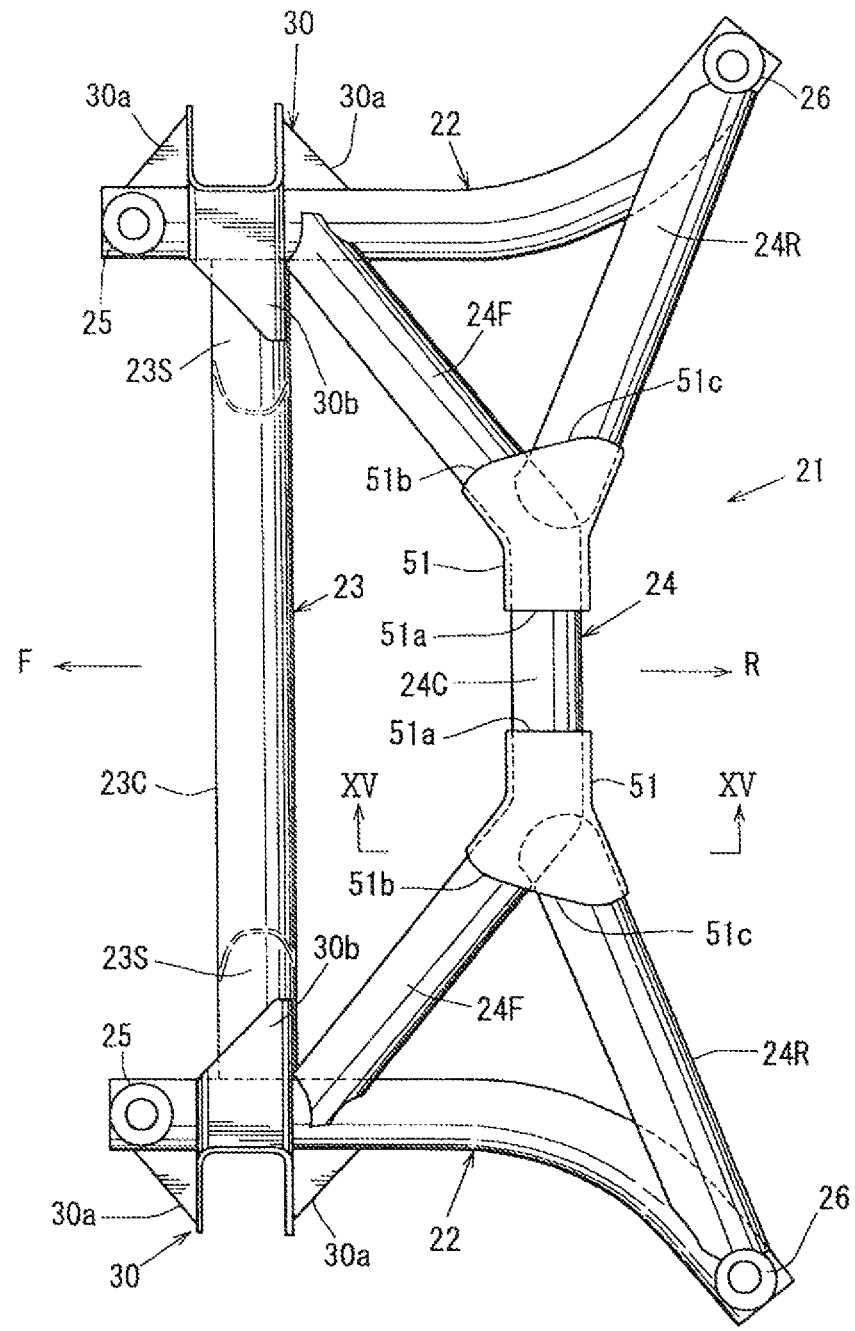
FIG. 14 is a top plan view illustrating an automotive rear vehicle body structure according to another embodiment of the present invention.
Figure 15:
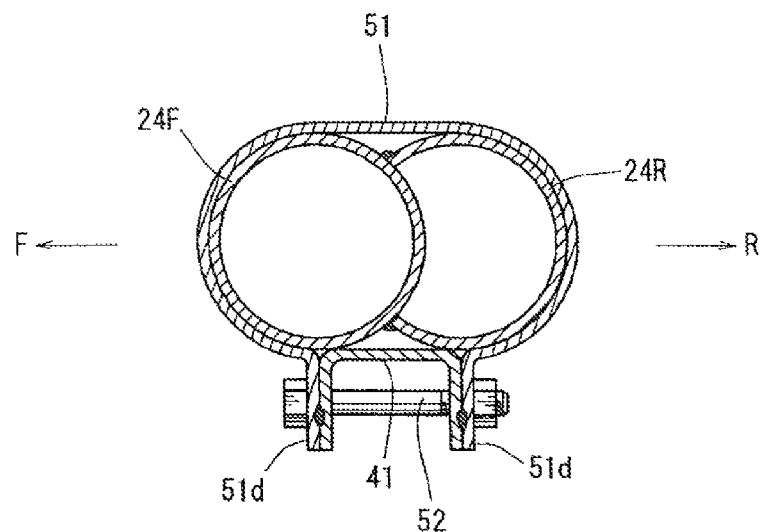
FIG. 15 is a sectional view taken along the arrowed line XV-XV in FIG. 14.

FIGS. 14 and 15 illustrate an automotive rear vehicle body structure according to another, second, embodiment of the present invention, wherein FIG. 14 is a top plan view, and FIG. 15 is a sectional view taken along the arrowed line XV-XV in FIG. 14.

In the second embodiment, in addition to the side member segments 22 and the front cross member segment 23, the rear cross member segment 24 is also formed into a pipe-like shape.

That is, the rear cross member segment 24 comprises: a central portion 24C; a forwardly-inclined portion 24F extending obliquely outwardly in the vehicle width direction and forwardly from each of opposite right and left ends of the central portion 24C; and a rearwardly-inclined portion 24R extending obliquely outwardly in the vehicle width direction and rearwardly while being branched with respect to the forwardly-inclined portion 24F. Among them, the central portion 24C and the forwardly-inclined portion 24F is integrally formed using the same pipe member, and a vehicle-widthwise outer end of the forwardly-inclined portion 24F is joined to each of the side member segments 22 by means of continuous welding. On the other hand, the rearwardly-inclined portion 24R is formed using a pipe member different from that for the central portion 24C and the forwardly-inclined portion 24F. A vehicle-widthwise inner end of the rearwardly-inclined portion 24R is joined to a vicinity of a boundary region between the forwardly-inclined portion 24F and the central portion 24C (in the embodiment illustrated in FIG. 14, a vehicle-widthwise inner end of the forwardly-inclined portion 24F) by means of continuous welding, and a vehicle-widthwise outer end of the rearwardly-inclined portion 24R is joined to the rear end region of the associated side member segments 22 by means of continuous welding.

A cross-sectionally approximately C-shaped bracket 51 is provided on a region where the central portion 24C, the forwardly-inclined portion 24F and the rearwardly-inclined portion 24R are joined together to form a Y shape in top plan view, in such a manner as to cover the region from thereoutside. An edge 51a of a vehicle-widthwise inner end of the bracket 51 is joined to the central portion 24C by means of continuous welding, and a front edge 51b and a rear edge 51c of a vehicle-widthwise outer end of the bracket 51 are joined, respectively, to the forwardly-inclined portion 24F and the rearwardly-inclined portion 24R by means of continuous welding.

As illustrated in FIG. 15, a pair of front and rear rear-lower-arm support pieces 51d extending downwardly are integrally provided with a lower portion of the bracket 51. A cross-sectionally angular C-shaped stiffner 41 is provided between the pair of front and rear rear-lower-arm support pieces 51d, and two attaching pieces of the stiffner 41 (two downwardly-protruding pieces provided at respective front and rear edges of the stiffner 41) are joined, respectively, to the rear-lower-arm support pieces 51d by means of welding. A rear-lower-arm support pin 52 is disposed to lay horizontally between the pair of front and rear rear-lower-arm support pieces 51d, and a vehicle-widthwise inner end of the rear lower arm 37 illustrated in FIG. 1 is pivotally supported by the rear-lower-arm support pin 52.

As above, in the embodiment illustrated in FIGS. 14 and 15, all of the central portion 24C, the forwardly-inclined portion 24F and the rearwardly-inclined portion 24R of the rear cross member segment 24 are formed into a pipe-like shape.

According to this feature, it becomes possible to further promote the achievement of lighter weight and higher rigidity in the rear subframe 21, and further promote the distribution of a rear impact load via the rear subframe 21.

In the embodiment illustrated in FIGS. 14 and 15, the remaining configuration, functions and effects are approximately the same as those in the aforementioned, first, embodiment. Thus, in FIGS. 14 and 15, the same element or component as that in the aforementioned figures is assigned with the same reference numeral or code, and its detailed description will be omitted.

Although some preferred embodiments of the present invention have been described based on FIGS. 1 to 15, it is to be understood that the present invention is not limited to the configurations illustrated in FIGS. 1 to 15.

For example, in the above embodiments, the lower-arm support bracket 31 is joined to both of the side member segment 22 and the front cross member segment 23, and, particularly, in joining between the lower-arm support bracket 31 and the front cross member segment 23, the lower-arm support bracket 31 is joined to a region of the front cross member segment 23 extending from each of right and left ends of the central portion 23C to a vehicle-widthwise outer end of each of the lateral portions 23S. Alternatively, the lower-arm support bracket 31 may be joined, at least, to a part of the central portion 23C of the cross member segment 23, or a vehicle-widthwise inner end (a region adjacent to the central portion 23C) of the lateral portion 23S.

Last of all, distinctive features disclosed in the above embodiments and functions and advantageous effects based on the features will be outlined.

The automotive rear vehicle body structure comprises: a rear subframe having right and left side member segments and a cross member segment coupling the side member segments together; and a rear suspension supported by the rear subframe. Each of the side member segments has a front region provided with a front fixing section attached to a vehicle-body component, and each of the side member segments is provided with, at respective positions rearward of the front fixing section and approximately identical to a position of each of right and left ends of the cross member segment in a front-rear direction, an upper-arm support bracket and a lower-arm support bracket located below the upper-arm support bracket. The upper-arm support bracket and the lower-arm support bracket are disposed such that a part of the respective brackets and the front fixing section of the side member segment are positionally coincident with each other in a vehicle width direction. The upper-arm support bracket has an upper-arm support section which is located at a position above the front fixing section of the side member segment and by which an upper arm of the rear suspension is pivotally supported, and the lower-arm support bracket has a lower-arm support section which is located at a position below the front fixing section of the side member segment and by which a lower arm of the rear suspension is pivotally supported. The cross member segment has: right and left lateral portions each composed of a pipe-like shaped member extending from each of the side member segments vehicle-widthwise inwardly and downwardly; and a central portion composed of a pipe-like shaped member coupling the lateral portions together, the central portion of the cross member segment being set at a height position above the lower-arm support section and below a vertically middle position between the upper-arm support section and the lower-arm support section. The lower-arm support bracket is coupled to the central portion of the cross member segment, or a vehicle-widthwise inner end of each of the lateral portions.

In the vehicle body structure of the present invention, the upper-arm support section and the lower-arm support section are provided rearward of the front fixing section of the side member segment in such a manner that their positions are partly coincident with the front fixing section in the vehicle width direction, so that it is able to achieve shortening of a distance between each of the arm support sections and the front fixing section in the vehicle width direction. This makes it possible to allow the arm support sections to be strongly attached to the vehicle body, thereby satisfying both ensuring of supporting rigidity for rear suspension arms (supporting rigidity for the upper arm and the lower arm), and lighter weight and higher rigidity in the rear subframe.

In the vehicle body structure of the present invention, the arm support sections and the cross member segment are arranged at approximately the same positions in the vehicle front-rear direction, so that it is able to suppress a vehicle-widthwise bending moment applied to the side member segment due to a lateral force (lateral load), and prevent an undesirable change in suspension geometry, as compared to the case where the three components are different in terms of a position in the front-rear direction.

In the vehicle body structure of the present invention, the lower-arm support bracket provided below the front fixing section of the side member segment is coupled to the central portion or a vehicle-widthwise inner end of each of the lateral portions in the cross member segment, so that it is able to linearly transmit a lateral force input from either one of the right and left lower arm support sections, to the other lower arm support section through the central portion, and thereby sufficiently ensure support rigidity for the lower arm.

In the vehicle body structure of the present invention, the central portion of the cross member segment is set at a position above the lower arm support section, and therefore cross (X)-shaped load transmission paths are formed between the upper arm support section on an upper-right side and the lower arm support section on a lower-left side and between the upper arm support section on an upper-left side and the lower arm support section on a lower-right side. In this way, same-phase lateral forces (lateral forces causing right and left rear wheels to tilt toward the same side) input during turning of an automotive vehicle or the like are cancelled out via the cross (X)-shaped load transmission paths, so that it is able to achieve enhanced rigidity of the rear subframe. In addition, the cross member segment is composed of a pipe member, so that it is able to effectively suppress plane resonance at a frequency of about 300 Hz.

In the vehicle body structure of the present invention, the central portion of the cross member segment is set at a position below the vertically middle position between the upper-arm support section and the lower-arm support section, so that it is able to shorten a vertical distance between the central portion of the cross member segment and the right and left lower arm support sections to which a relatively large lateral force (lateral force greater than a lateral force against the upper arm support section) is to be applied. In this way, different-phase lateral forces (lateral forces causing the right and left rear wheels to tilt toward respective different sides) input during traveling of the vehicle on bumpy road or the like can be cancelled out in a horizontal direction through the central portion.

In short, the vehicle body structure of the present invention can ensure not only rigidity against same-phase lateral forces but also rigidity against difference-phase lateral forces, and further suppress plane resonance at a frequency of about 300 Hz.

Preferably, in the above vehicle body structure, each of the side member segments is formed from a pipe-like shaped member, and the lower-arm support bracket is coupled to the side member segment.

According to this feature, the side member segment is formed from a pipe-like shaped member (closed cross-section structural member) resistant to torsion, and the lower-arm support bracket including the lower-arm support section is coupled to not only the cross member segment but also the side member segment, so that it is able to further promote a reduction in weight and an increase in rigidity against a lateral force, in the rear subframe.

Preferably, in the above vehicle body structure, the upper-arm support section is provided in the upper-arm support bracket at a position located on an extension line extending outwardly in the vehicle width direction from each of the right and left lateral portions of the cross member segment.

According to this feature, upon input of right and left same-phase lateral forces, it is able to more effectively cancel out the lateral forces between the upper-arm support section on either one of right and left sides of the rear subframe and the lower-arm support section on the other side. It is also able to shorten a distance in the front-rear direction between each of the arm support sections and the front fixing section of the side member segment and thereby achieve lighter weight and higher rigidity in the rear subframe, as compared, for example, to a structure in which both of the arm support sections are provided below the side member segment (for this purpose, the arm support sections are positionally offset in the front-rear direction).

Preferably, in the above vehicle body structure, the rear subframe comprises, at a position spaced apart rearwardly from the cross member segment, a rear cross member segment supporting a rear lower arm of the rear suspension The rear cross member segment comprises a central portion having a rear-arm support section which is provided at each of right and left portions thereof and by which the rear lower arm of the rear suspension is pivotally supported, and a forwardly-inclined portion and a rearwardly-inclined portion branched forwardly and rearwardly from each of the right and left ends of the central portion and coupled to each of the side member segments.

According to this feature, each of right and left portions of the rear cross member segment is coupled to each of the side member segments while being branched into two in a forked manner, so that a truss structure is formed by the branched portions (the rearwardly-inclined portion and the forwardly-inclined portion) and the side member segment. The truss structure can efficiently reinforce the rear cross member segment and thus the side member segment, so that it is able to enhance support rigidity for the rear lower arm while suppressing an increase in weight. In addition, the rear cross member segment configured as above and the front cross member segment formed using a pipe member provide an advantage of being able to significantly enhance rigidity of the rear subframe against input loads in the front-rear direction and vehicle width direction. Furthermore, it is able to enhance rigidity of the rear-arm support section against a load in the front-rear direction.

What is claimed is;

1. An automotive rear vehicle body structure comprising: a rear subframe having right and left side member segments and a cross member segment coupling the side member segments together; and a rear suspension supported by the rear subframe, wherein:

each of the side member segments has a front region provided with a front fixing section attached to a vehicle-body component;

each of the side member segments is provided with, at respective positions rearward of the front fixing section and approximately identical to a position of each of right and left ends of the cross member segment in a front-rear direction, an upper-arm support bracket and a lower-arm support bracket located below the upper-arm support bracket;

the upper-arm support bracket and the lower-arm support bracket are disposed such that a part of the respective brackets and the front fixing section of the side member segment are positionally coincident with each other in a vehicle width direction;

the upper-arm support bracket has an upper-arm support section which is located at a position above the front fixing section of the side member segment and by which an upper arm of the rear suspension is pivotally supported;

the lower-arm support bracket has a lower-arm support section which is located at a position below the front fixing section of the side member segment and by which a lower arm of the rear suspension is pivotally supported;

the cross member segment has: right and left lateral portions each composed of a pipe-like shaped member extending from each of the side member segments vehicle-widthwise inwardly and downwardly; and a central portion composed of a pipe-like shaped member coupling the lateral portions together, the central portion of the cross member segment being set at a height position above the lower-arm support section and below a vertically middle position between the upper-arm support section and the lower-arm support section;

the lower-arm support bracket is coupled to the central portion of the cross member segment, or a vehicle-widthwise inner end of each of the lateral portions;

the rear subframe comprises, at a position spaced apart rearwardly from the cross member segment, a rear cross member segment supporting a rear lower arm of the rear suspension; and the rear cross member segment comprises a central portion having a rear-arm support section which is provided at each of right and left portions thereof and by which the rear lower arm of the rear suspension is pivotally supported, and a forwardly-inclined portion and a rearwardly-inclined portion branched forwardly and rearwardly from each of the right and left ends of the central portion and coupled to each of the side member segments.

2. The automotive rear vehicle body structure as defined in claim 1, wherein each of the side member segments is formed from a pipe-like shaped member, wherein the lower-arm support bracket is coupled to the side member segment.

3. The automotive rear vehicle body structure as defined in claim 1, wherein the upper-arm support section is provided in the upper-arm support bracket at a position located on an extension line extending vehicle-widthwise outwardly from an adjacent one of the right and left lateral portions of the cross member segment.

* * * * *